July 23, 1935.  J. S. HIGHFIELD  2,009,318

METHOD OF JOINING TOGETHER OR ANCHORING WIRE CABLES AND APPARATUS THEREFOR

Filed Oct. 23, 1930

INVENTOR
John S. Highfield,
BY
ATTORNEY

Patented July 23, 1935

2,009,318

UNITED STATES PATENT OFFICE 2,009,318

METHOD OF JOINING TOGETHER OR ANCHORING WIRE CABLES AND APPARATUS THEREFOR

John Somerville Highfield, London, England

Application October 23, 1930, Serial No. 490,786
In Great Britain October 29, 1929

7 Claims. (Cl. 173—303)

This invention relates to methods of, and apparatus for, joining together stranded wire cables or for anchoring the ends of such cables. The invention is particularly applicable to cables such as electrical transmission cables which consist of a core built up from a heart wire and a number of surrounding wires, the core being surrounded in turn by one or more further layers of wire; for example the core may be made of steel and the outer layers of copper or aluminium.

It has been found that in practice cables break at the clamps before the ultimate strength of the cable is reached, even though the clamp itself can carry the load. The primary object of the present invention is to provide a clamp by which the tension exerted on the cable shall be applied to compress the strands radially, thus locking the strands together and making the whole cable within the clamp stronger and more solid.

A further object of the invention is to provide a clamp which shall be cheaper to make and easier to assemble than any hitherto.

The present invention utilizes a female conical member and a male conical member which is initially of somewhat blunter taper than the female conical member and is arranged to surround a cable so that when it is forced into the female member it grips the cable more tightly towards its large end than at its small end. The conical members are arranged so that when tension is applied to the cable, the male member is forced very tightly into the female member so that th cable is very firmly gripped.

A particular feature of the invention consists in providing the male member with teeth which are made progressively larger towards the blunt end of the member. This feature, combined with the fact that the taper of the male and female members is initially different, results in the larger teeth being firmly embedded in the cable and in the cable only being substantially reduced in cross-section at points where it is not subjected to its greatest stress.

According to a further feature of the invention, the male and female conical members are arranged to grip only the inner strands of a cable, the outer strands being cut short before they reach the said members, and the tension in the inner strands is transmitted by the said members to a conical gripping device surrounding the outer strands so that the gripping device is wedged between the outer strands and a conical sleeve connected to another cable or anchored by means of any suitable hook, ring or the like to an anchoring point.

When the clamp in accordance with the invention is used for joining two cables together, the sleeves may either be initially separate and then be secured together in any suitable way, or they may be made integral with one another. When the clamp is used as an anchor any suitable hook, ring or the like may be connected to the sleeve so that it may be attached to the anchoring point.

In order that the invention may be clearly understood and readily carried into effect, a clamp in accordance therewith will now be described by way of example with reference to the accompanying drawing in which Figure 1 shows a part elevation and part section through one form of clamp;

Figure 1:
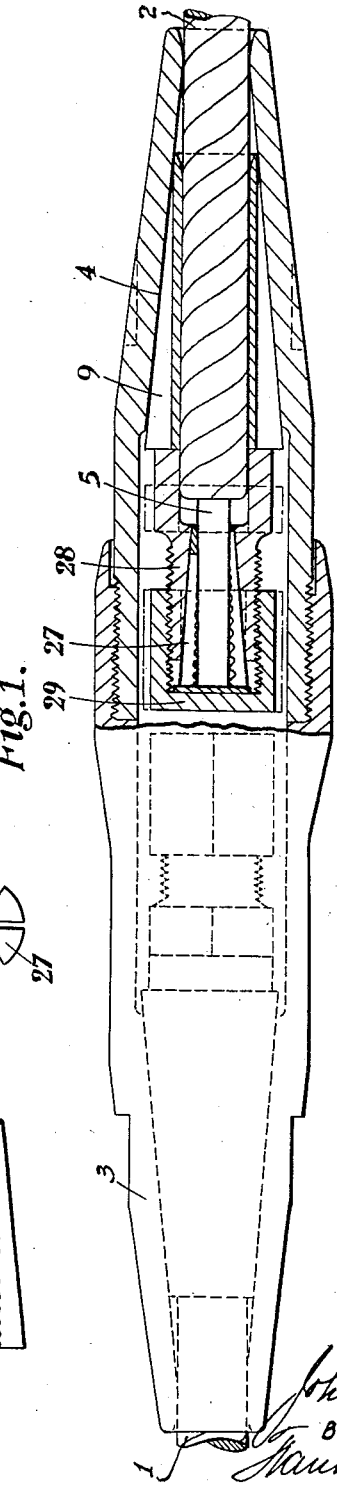
Figure 3:
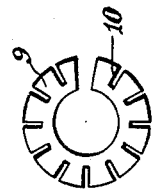
Figures 2 and 3 show a section and end elevation respectively of a detail employed.
Figure 2:
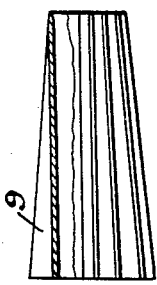

The clamp shown in Figure 1 is used for joining together the ends of two cables 1 and 2, and consists essentially of two sleeves 3 and 4 screwed together. The central strands 5 of the cable 2 are clamped between a split conical male member 27 and an internally conical female member 28. The outerstrands for the cable which are cut short so as to allow the inner strands 5 to project are caught within a split smooth-bored externally conical member 9 which is formed with a number of longitudinal cuts 10 so that in effect it acts as a series of wedges. This member 9 fits within the end of the sleeve 4 which is made internally conical. The edges of the longitudinal gap are made radial, so that if the gap closes, the edges will lie in close contact with one another. One end of the member 28 abuts against one member 9, so that when tension is applied to the cable 2 the inner strands 5 take a considerable part of the load which is transmitted to the member 9. The remainder of the load is taken by the clamping action of the member 9 which surrounds all the strands of the cable.

Figure 6:
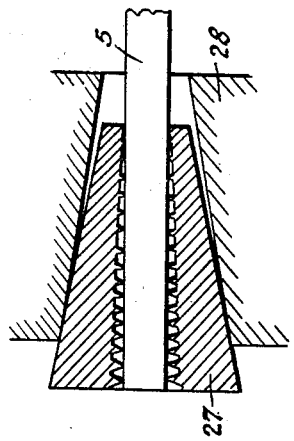
Figure 6 is an enlarged detail view of the coupling member and the male member associated with a cable.
Figure 5:
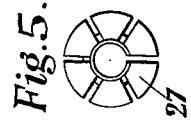
Figures 4 and 5 show a section and end elevation respectively of the clamp shown in Figure 1.
Figure 4:
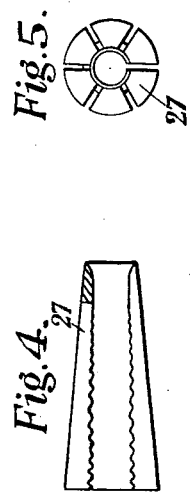

The cable is shown as having the central strands 5 clamped between a split conical member 27 and an internally conical member 28 which abuts directly against the conical member 9. The cone 27 as shown in Figures 4 and 5 is formed with internal teeth which are deepest at the large end and taper away to nothing. The cone 27 is made of a blunter taper than the conical member 28 so that initially the cone 27 cannot enter completely into the conical member 28. An internal threaded cap 29 is arranged to engage threads on the outside of the member 28, and on being screwed up tends to force the cone 27 into the member 28. As a result pressure is exerted upon the teeth of the cone 27 which are made of hardened steel and which bite into the strands of the core 5. Since the teeth are of different depths the effect is to change the taper of the cone 27 so that it becomes of the same taper as the inside of the member 28 and can, therefore, be forced into the latter, thus securely gripping the central strands 5. It will be seen that in the clamp shown the whole load on the cable is ultimately taken on the sleeve 4.

In order to make the whole joint waterproof any suitable waterproof composition may be painted upon the end of the cable or the whole sleeve may be filled with oil or composition.

I claim:

1. The method of connecting the end of a cable to another cable or support which consists in placing around the cable a bored and externally tapered male member with its thick end adjacent the other cable or support and its thin end remote therefrom, assembling over said male member a female member of internal taper less in degree than the external taper of said male member when the latter is resting around the cable, and forcing said male and female members together to cause said male member to bite into the cable until its external taper becomes the same as the internal taper of the said female member, whereafter any pull on said cable tends to pull said male member further into said female member to tighten the parts.

2. In a clamp for holding the end of a cable, in combination, an internally tapered female member having a smooth bore throughout, the said bore being tapered towards the outer end of female member and a split male member having a smooth external surface tapered towards its outer end enabling it to slide into said female member when subjected to the pull of a cable, said male member being formed with a bore to receive a cable and being so shaped that when initially assembled around the cable the external taper of the male member is blunter than the internal taper of said female member but that when said members are forced together so that said male member bites into said cable, the external taper of said male member becomes substantially the same as the internal taper of said female member.

3. A coupling for cables comprising a sleeve, a cable extending into said sleeve and having a bared end portion to expose the end portion of its conductor, a gripper in said sleeve to engage about the cable and having wedging fit in the sleeve, a female member fitting about the bared portion of the conductor of the cable and abutting said gripper to limit outward movement of the female member in the sleeve, said female member having a conductor receiving bore tapered outwardly and formed with smooth walls, a male member fitting about the bared portion of the conductor within the bore of said female member and being tapered and having walls of its bore formed with teeth increasing in depth towards the larger end of the male member, the male member being split longitudinally and initially of a taper to cause constriction of the male member about the conductor when moved longitudinally in the female member towards the smaller end of the bore thereof, and a cap threaded upon said female member and engaging the male member to force the male member into place.

4. A coupling for cables comprising a sleeve, a cable extending into said sleeve and having a bared end portion to expose the end portion of its conductor, a female member in said sleeve fitting about the cable and having a bore to receive the bared portion of the conductor, the bore being tapered towards the end of the sleeve and formed with smooth walls, a bored male member fitting about the bared portion of the conductor within the bore of the female member and tapered towards the small end of the bore of the female member and having a blunter taper than the female member, said male member having walls of its bore formed with teeth increasing in depth towards the large end of the male member and the male member being split longitudinally and initially of a taper to cause constriction thereof when the male member is moved longitudinally in the female member towards the small end of the bore thereof, and means carried by the female member to force the male member into place.

5. A coupling for cables comprising a sleeve, cables extending into said sleeve through ends thereof and each having its end portion bared to expose an end portion of its conductor, cable gripping means in each end of said sleeve, a female member fitting about each cable in abutting relation to the inner end of a gripper and having a smooth walled bore tapered towards the gripper and receiving the bared end portion of a conductor, a tapered male member fitting into each female member and having a conductor receiving bore formed with teeth increasing in depth towards the large end of the male member, the male member being tapered towards the small end of the bore of the female member and being split longitudinally and initially of a taper to cause constriction of the male member when moved longitudinally in the female member towards the small end of its bore whereby pull exerted upon the cables in a direction away from each other will cause the male members to have tight binding grip upon the bared conductors of the cables, and means carried by each female member to force its companion male member into place.

6. In combination, a suitably held internally tapered coupling member, a bored and externally tapered longitudinally split male member having a taper from its larger rear end to its smaller front end greater than the internal taper of the coupling member from its larger to its smaller end, whereby when the front end of the male member is inserted in the coupling member it engages the coupling member with its small end out of contact with the coupling member, whereby the rear end of the male member is under pressure when moving longitudinally of the coupling member before the small end of the male member contacts the coupling member, whereby compression of the male member initially is rearwardly of its front end for clampingly engaging a cable positioned within the male member, the gripping action of the male member on the cable being progressively increased as the male member enters the coupling member and the taper of the male member becomes approximately the same as the internal taper of said coupling member, whereby pull exerted upon the cable away from its extremity tends to pull said male member further into clamping engagement with said cable.

7. In combination, a suitably held internally tapered coupling member and a bored externally tapered longitudinally split male member having a taper which is greater than the internal taper of said coupling member, said male member having an aperture with a friction surface for receiving the extremity of a cable and adapted when urged longitudinally within said coupling member to clampingly engage a cable positioned within said aperture and to firmly grip said cable when the taper of the male member becomes the same as the internal taper of the coupling member whereby a pull exerted upon the cable away from its extremity will tend to pull said male member further in clamping engagement with said cable.

JOHN SOMERVILLE HIGHFIELD.